United States Patent [19]
Miyake et al.

[11] 4,448,947
[45] May 15, 1984

[54] ONE-CAN TYPE PRESSURE-SENSITIVE ADHESIVE COMPOSITION

[75] Inventors: Jun-ichi Miyake; Kyuya Yamazaki; Yoshio Kamatani, all of Osaka, Japan

[73] Assignee: Takeda Chemical Industries, Ltd., Osaka, Japan

[21] Appl. No.: 445,094

[22] Filed: Nov. 29, 1982

[30] Foreign Application Priority Data

Dec. 8, 1981 [JP] Japan ................................ 56-197939

[51] Int. Cl.$^3$ ...................... C08G 18/77; C08G 18/78; C08G 18/79; C07D 273/04
[52] U.S. Cl. .................................... 528/73; 528/44; 528/67; 528/75; 544/67
[58] Field of Search ........................ 528/44, 67, 73, 75

[56] References Cited

U.S. PATENT DOCUMENTS 3,666,835  5/1972  Schloss ................................ 260/858
3,730,953  5/1973  Naito et al. ............................ 528/44

FOREIGN PATENT DOCUMENTS 1145952  3/1969  United Kingdom .

Primary Examiner—H. S. Cockeram
Attorney, Agent, or Firm—Antonelli, Terry & Wands

[57] ABSTRACT

Disclosed is a one-can type pressure-sensitive adhesive composition which contains a polyurethane polyol obtained by the reaction of an isocyanate component having oxadiazine-2,4,6-trione ring, other organic diisocyanate and a polyol component having a molecular weight of 400 to 50,000 at a specific proportion. This composition has an excellent heat resistance, stable pressure-sensitive adhesion, holding power and tackiness.

11 Claims, No Drawings

ONE-CAN TYPE PRESSURE-SENSITIVE ADHESIVE COMPOSITION

This invention relates to a one-can type polyurethane pressure-sensitive adhesive composition.

Conventionally, as pressure-sensitive adhesive compositions, there are rubber adhesive compositions which are mainly composed of natural rubber or synthetic rubber and acrylic ones which are mainly composed of polyacrylic esters. However, urethane pressure-sensitive adhesive compositions have not yet been commercially available.

This is because in the case of urethane pressure-sensitive adhesives it is necessary to yield suitable tackiness, adhesion and cohesion together by the reaction of isocyanate group and hydroxyl group while since the reaction of isocyanate group and hydroxyl group is liable to be affected by working atmosphere such as temperature, humidity, etc., it is very difficult to obtain suitable tackiness and adhesion and furthermore since there are problems of short pot life and difficulty in selection of catalysts, it is impossible to obtain pressure-sensitive adhesives having stable performance.

On the other hand, commercially available rubber and acrylic pressure-sensitive adhesives require solvents in a large amount and so have the problems of environmental pollution and bad smell developed by unreacted acrylic monomers. Therefore, much expense is required for overcoming these problems to cause increase in cost of the adhesives.

The present inventors have studied, for a long time, preparation and use of isocyanate component having oxadiazine-2,4,6-trione ring obtained by the reaction of polyisocyanate and carbon dioxide. As a result, it has been found that polyurethane polyols obtained by reacting said isocyanate component with a polyol component at a specific proportion in the presence of an organic diisocyanate have excellent heat resistance and provide stable pressure-sensitive adhesion and furthermore can much increase percentage of solid matter in the composition than the conventional polyurethane polyols.

That is, this invention relates to a one-can type pressure-sensitive adhesive composition which contains a polyurethane polyol obtained by reacting an isocyanate component having oxadiazine-2,4,6-trione ring, other organic diisocyanate and a polyol component at such a proportion that the number of oxadiazinetrione ring/the total number of free isocyanate group is $\frac{1}{2}$ to 1/20 and (the number of oxadiazinetrione ring + the total number of free isocyanate group)/(the number of hydroxyl group of polyol component) is less than 1.0.

The isocyanate component having oxadiazine-2,4,6-trione ring used in this invention can be obtained, for example, by the reaction of an isocyanate with carbon dioxide.

As examples of the isocyanate, there are aliphatic, alicyclic and aromatic-aliphatic polyisocyanates such as tetramethylene diisocyanate, hexamethylene diisocyanate, ω,ω'-diisocyanatodipropyl ether, 2,6-diisocyanatocaproic acid ester, 1,6,11-triisocyanatoundecane, bis(isocyanatomethyl)cyclohexane, bis-(isocyanatoethyl)cyclohexane, 1-isocyanato-3-isocyanatomethyl-3,5,5-trimethylcyclohexane, bis(4-isocyanatocyclohexyl)methane, xylylene diisocyanate, bis(2-isocyanatoethyl)benzene, etc. These polyisocyanates may be used alone or as a mixture thereof.

The reaction of the isocyanate with carbon dioxide is carried out in the presence of a catalyst. As the catalyst, tertiary phosphines, arsenic compounds and hydroquinones may be used and the tertiary phosphines are especially effective. When an isocyanate having oxadiazinetrione ring has been obtained by the reaction of an isocyanate with carbon dioxide, the reaction product may be used, as it is, as the isocyanate component of this invention, but usually various compounds are preferably added thereto for termination of the reaction and stable storage of the product. Such reaction terminators and stabilizers include alkylating agents, acylating agents, acids, ester derivatives, phenols, peroxides, sulfur, polysulfides, metal sulfides, halogens, etc. Especially, the isocyanate component having oxadiazinetrione ring to which an additive selected from peroxides, sulfur, polysulfides, metal sulfides and halogens is added is preferred because the reaction of oxadiazinetrione ring and isocyanate with hydroxyl group of polyol component smoothly proceeds.

In the preparation of the isocyanate component having oxadiazinetrione ring from polyisocyanates and carbon dioxide, adducts having terminal NCO group may also be used as the polyisocyanate. Such adducts can be obtained by reacting polyisocyanates with polyol compounds (e.g., ethylene glycol, propylene glycol, 1,4-butanediol, glycerine, trimethylolpropane, polyether polyol, polyester polyol, acrylic polyol, epoxy polyol, etc.) or polyamine compounds(e.g., ethylenediamine, hexamethylenediamine, phenylenediamine, polyether polyamine, polyamide polyamine, etc.) in an excess ratio of NCO group to active hydrogen of the polyol or polyamine compounds. Polyisocyanates, the isocyanate groups of which are partially blocked with a blocking agent and those having partially dimerized or trimerized NCO groups may also be used as the polyisocyanates.

Of the isocyanate components having oxadiazine-2,4,6-trione ring enumerated above, those which are derived from hexamethylene diisocyanate, 3-isocyanatomethyl-3,5,5-trimethylcyclohexyl isocyanate or bis (isocyanatomethyl) cyclohexane provide compositions especially excellent in adhesion performance and curability.

When said isocyanate component having oxadiazine-2,4,6-trione ring contains unreacted isocyanate monomers, low functional substances, etc. and, therefore, is unsuitable to use as it is, it is also possible to remove the monomers, low functional substances, etc. by appropriate methods such as distillation, extraction, crystallization, etc.

Said isocyanate components may be those having one or two or more oxadiazine-2,4,6-trione rings or mixtures thereof.

As the other organic diisocyanates than the isocyanate components having oxadiazine-2,4,6-trione ring, all of known organic diisocyanates can be used and as examples thereof, mention may be made of aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate, etc., alicyclic diisocyanates such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylene-bis(cyclohexyl isocyanate), methyl 2,4-cyclohexane diisocyanate, methyl 2,6-cyclohexane diisocyanate, 1,4-bis(isocyanatomethyl)cyclohexane, 1,3-bis(isocyanatomethyl)cyclohexane, etc., aromatic diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate or a mixture thereof, 4,4'-toluidine diisocyanate, dianisidine diisocyanate, 4,4'-diphenylether diisocyanate, etc., aromatic-aliphatic diisocyanates such as 1,3- or 1,4-xylylene diisocyanate or a mixture thereof, $\omega,\omega'$-diisocyanato-1,4-diethylbenzene, etc.

These organic diisocyanates may be reaction products with polyol components, polyamines, etc. as mentioned hereinafter. Specifically, they may be adducts having terminal NCO group obtained by reacting organic diisocyanate with a polyester polyol, polyether polyol, epoxy polyol, polyether polyamine or polyamide polyamine in an excess ratio of NCO group to active hydrogen of the polyols or polyamines.

Examples of the polyol component which may be suitably used in this invention are polyols having a molecular weight of 400 to 50,000, preferably 500 to 30,000, such as polyester polyols, polyether polyols, polyether-ester polyols, polyester-amide polyols, acrylic polyols, polyurethane polyols, epoxy polyols, epoxy-modified polyols, polyhydroxyalkanes, oil-modified polyols, castor oil or mixtures thereof. Use of a polyol having a molecular weight of less than 400 produces the composition having insufficient tackiness. While, use of a polyol having a molecular weight of more than 50,000 provides poor workability because the composition has too high viscosity.

Examples of said polyester polyols are reaction products of polyhydric alcohols and polybasic acids. As the polyhydric alcohols, mention may be made of ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acids, mention may be made of succinic acid, adipic acid, azelaic acid, sebacic acid, phthalic acid, isophthalic acid, terephthalic acid, tetrahydrophthalic acid, hexahydrophthalic acid, maleic acid, fumaric acid and acid anhydrides thereof, etc. Further suitable examples are polyester polyols obtained by ring opening polymerization of lactones such as caprolactone, methylcaprolactone, etc. with glycols, etc. There can also be used oil-modified polyols. Such polyols can be obtained by modifying said polyester polyols with fatty acids such as coconut, cotton seed and safflower fatty acid.

Examples of the polyether polyols are those which are obtained by polymerization of epoxide compounds such as ethylene oxide, propylene oxide, butylene oxide, tetrahydrofuran, styrene oxide, epichlorohydrin, phenylglycidyl ether, allylglycidyl ether, etc. in the presence of a catalyst such as boron trifluoride or by addition of these epoxide compounds alone or as a mixture or alternately to reactive hydrogen atom-containing initiators. As the reactive hydrogen atom-containing initiators, mention may be made of water, polyols such as ethylene glycol, propylene glycol, glycerol, trimethylolpropane, pentaerythritol, sorbitol, etc., amino alcohols such as ethanol amine, polyamines such as ethylenediamine, etc.

As examples of the polyether-ester polyols, mention may be made of those which are obtained by subjecting said polyether polyols and polybasic acids to polyesterification reaction and besides those which have both the segments of polyether and polyester in one molecule and which are obtained by ring-opening copolymerization of epoxide compounds and acid anhydrides.

Examples of the polyester-amide polyols are those which are obtained by said polyesterification reaction where amino group-containing staring materials such as ethylenediamine, propylenediamine, hexamethylenediamine, xylylenediamine, hydrogenated xylylenediamine, ethanolamine, propanolamine, etc. are additionally used.

The hydroxyl group-containing polymers generally called acrylic polyols can be prepared by copolymerizing polymerizable monomers containing at least one hydroxyl group in one molecule with other monomers copolymerizable with said monomers. As the hydroxyl group-containing monomers, mention may be made of hydroxyethyl acrylate, hydroxypropyl acrylate, hydroxybutyl acrylate, trimethylolpropane monoacrylate, their corresponding methacrylic acid derivatives, polyhydroxyalkyl maleate and fumarates, etc. As examples of the copolymerizable monomers, mention may be made of, for example, acrylic acid, its methyl, ethyl, propyl, butyl, 2-ethylhexyl esters, methacrylic acid, maleic acid, fumaric acid, itaconic acid and their esters as enumerated above and vinyl monomers such as styrene, $\alpha$-methylstyrene, vinyl acetate, acrylonitrile, methacrylonitrile, etc.

As examples of polyurethane polyols, mention may be made of reaction products of polyols and polyisocyanates which have terminal hydroxyl group. Examples of the polyols are polyols such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol, sorbitol, etc. or polymer polyols such as polyester polyol, polyether polyol, polyester ether polyol, polyester amide polyols, etc. As the polyisocyanates, mention may be made of said organic diisocyanates and furthermore polyisocyanates such as dimers, trimers, etc. of these organic diisocyanates. Furthermore, reaction products of said polyisocyanates with said polyols a part of which is substituted with an amino compound such as ethylenediamine, propylenediamine, hexamethylenediamine, xylylenediamine, bisaminomethylcyclohexane, 3-aminomethyl-3,5,5-trimethylcyclohexylamine, ethanolamine, propanolamine, etc. may also be used as the polyurethane polyols.

Examples of the epoxypolyols are epoxy resins obtained by condensation reaction of a polyphenol compound or its ring hydrogenated product with epichlorohydrin. Besides these resins, epoxy ester resins obtained by reacting a fatty acid with an epoxy resin or modified epoxy resins obtained by reacting an alkanolamine with an epoxy resin may also be used.

Examples of the polyhydroxyalkanes are hydrolyzed products of vinyl acetate homopolymers or copolymers of vinyl acetate with other ethylenic copolymerizable monomers and polybutadiene polyols.

Not only the hydroxyl group-containing compounds of relatively high molecular weight mentioned hereinabove, but low molecular weight polyols having a molecular weight of about 62 to 400 may be used as mixtures. As these low molecular weight polyols, mention may be made of ethylene glycol, propylene glycol, butylene glycol, hexylene glycol, neopentyl glycol, cyclohexanedimethanol, glycerol, trimethylolpropane, pentaerythritol, diethylene glycol, triethylene glycol, dipropylene glycol, etc.

According to this invention, polyurethane polyols are obtained by reacting an isocyanate component having oxadiazine-2,4,6-trione ring, an organic diisocyanate other than said isocyanate component and a polyol component at a specific proportion as mentioned below.

The number of oxadiazinetrione ring/the total number of free isocyanate group is in the range of $\frac{1}{2}$ to 1/20, preferably 1/5 to 1/15 and (the number of oxadiazinetrione ring + the total number of free isocyanate group)/(the number of hydroxyl group of polyol component) is less than 1.0, especially preferably from 0.1 to 0.9. When the ratio of the number of oxadiazinetrione ring/the total number of free isocyanate group exceeds 1/2, the composition has high degree of crosslinking and therefore the product obtained by curing has poor tackiness. When the above ratio is less than 1/20, the composition has too low degree of crosslinking and therefore it cannot provide sufficient holding power. In case of (the number of oxadiazinetrione ring + the total number of free isocyanate group)/(the number of hydroxyl group of polyol component) being 1.0 or more, there is obtained a polyurethane polyol having terminal isocyanate groups instead of terminal hydroxyl groups.

By this reaction there is obtained a product having oxadiazine-2,4,6-trione ring and terminal hydroxyl group in the molecule.

The above reaction can be carried out under the conditions for ordinary reaction of isocyanate group with hydroxyl group in the presence or absence of organic solvents. Known catalysts for production of urethane may be added at this reaction.

As the organic solvents, there may be used esters such as ethyl acetate, butyl acetate, ethoxyethyl acetate, etc., aromatic solvents such as toluene, xylene, etc., ketones, such as acetone, methyl ethyl ketone, methyl isobutyl ketone, etc., ethers such as tetrahydrofuran, dioxane, etc. and halogenated hydrocarbons such as trichloroethane, trichloroethylene, ethylene dichloride, etc.

Thus the one-can type pressure-sensitive adhesive composition containing polyurethane polyol of this invention is obtained and the solid content in this composition is usually about 50 to 80% by weight. This composition may additionally contain curing catalysts such as tertiary amines, tertiary phosphines, etc., tackifiers, plasticizers, antioxidants, UV stabilizers, pigments, etc.

As examples of the tertiary amines, mention may be made of azabicycloalkenes such as 1,5-diazabicyclo [5,4,0]-5-undecene, 1,5-diazabicyclo[4,3,0]-5-nonene, etc., chain or partially cyclic aliphatic polyamines such as N,N,N',N'-tetramethylethylenediamine, N,N,N',N'-tetramethyl-1,6-hexanediamine, N,N-bis(2-dimethylaminoethyl)methylamine, N-(2-dimethylaminoethyl)morpholine, N-methyl-N'-(2-dimethylaminoethyl)-piperazine, N,N,N'-trimethyl-N'-(2-hydroxyethyl)ethylenediamine, bis(2-dimethylaminoethoxy)methane, tetramethylguanidine, etc., cyclic monoamines such as quinuclidine, N,N'-dialkylpiperazines, N-alkylpiperazines, alkylation derivatives thereof, etc. Furthermore, salts of organic acids, amino acids or inorganic acids of said tertiary amines may also be used.

As the tertiary phosphines, aromatic and aliphatic tertiary phosphines may be used. Examples of these phosphines are triethylphosphine, tri-n-butylphosphine, dimethylphenylphosphine, triphenylphosphine, diethylcyclohexylphosphine, 1-ethylphospholane, 1-n-butylphosphane, 1,4-diphosphabicyclo[2,2,2]octane, tris(hydroxyethyl) phosphine, etc.

Said tertiary amines and tertiary phosphines act as catalysts for reaction of oxadiazinetrione ring with hydroxyl group. Amount of them can be optionally chosen depending on kind of polyurethane polyol, curing conditions, pot life, etc. and usually is 0.001 to 10%, preferably 0.01 to 1% by weight of solid matter.

Said tertiary amines or phosphines may be mixed with the compositions at the use as a solution in suitable said organic solvents such as ethyl acetate, toluene, acetone, methyl ethyl ketone, etc. or may be added as they are to the compositions without dissolving them in solvents.

As examples of the tackifiers, mention may be made of rosin, terpene resin, cumarone resin, alkylphenol resin, terpenephenol resin, xyleneformaldehyde resin, aliphatic or aromatic petroleum resin, etc. These tackifiers may be mixed with the compositions at their use as a solution in suitable solvents such as ethyl acetate, toluene, methyl ethyl ketone, etc. Amount of these tackifiers to be added to the composition may be not more than about 30% by weight of solid matter, preferably not more than 15% by weight.

As the plasticizers, for example, dibutyl phthalate, dioctyl phthalate, dioctyl adipate, etc. may be used.

Said tackifiers or plasticizers are preferably those which are low in reactivity with isocyanate.

Examples of the antioxidants are hydroquinone, 2,6-di-tert-butyl-4-methylphenol, etc. and examples of the UV stabilizers are 2,4-dihydroxybenzophenone, 2-(2'-hydroxy-5'-methylphenyl)benzotriazole, etc. For example, titanium oxide is used as the pigments.

Double-side adhesive tapes may be prepared using the thus obtained one-can type pressure-sensitive adhesive composition of this invention, for example, in the following manner. That is, the composition is coated on a release paper (e.g., glassine separator) by reverse-roll coater, kiss-roll coater or knife coater, the solvent is removed at about 80° C. to 150° C. in about 0.5 to 5 minutes, then a base fabric such as non-woven fabrics, e.g., nylon, rayon, etc., foamed materials, e.g., polyethylene, polyurethane, rubbers, etc., Japanese paper, etc. is applied onto the coating and the composition is then directly coated on said base fabric in the same manner as on the release paper. Then, the coated fabric is dried and thereafter rolled. The coating thickness is usually in the range of about 25μ to 100μ (solid matter thickness).

Since the composition of this invention has oxadiazinetrione ring and hydroxyl group in the molecule, it can self-cure and troubles for accurate weighing of curing agent and main component required for two-can type composition may be saved. Besides, the composition of this invention has excellent adhesion, holding power and tackiness and so can be favorably employed for adhesion of foamed materials such as polyethylene foam, polyurethane foam, etc., plastics such as soft PVC, metals, etc.

This invention will be further illustrated in the following Reference Examples and Examples, in which parts are by weight.

REFERENCE EXAMPLE 1

To 841 g of hexamethylene diisocyanate was added 1.8 g of tri-n-butylphosphine while introducing carbon dioxide thereinto at 40° C. and the reaction was carried out for 6 hours under stirring. The introduction of carbon dioxide was discontinued and 0.8 g of sulfur powder was added to the reaction product. The mixture was stirred for 30 minutes and then was cooled. Starting materials were removed from the product by evaporation with a film evaporator to obtain 255 g of viscous liquid of pale yellow. This product had a NCO content of 4.78 meq/g., an oxadiazine-2,4,6-trione ring content of 2.77 meq/g and a residual monomer content of 0.4%.

REFERENCE EXAMPLE 2

To 971 g of 1,3-bis(isocyanatomethyl)cyclohexane was added 3.0 g of tri-n-butylphosphine while introducing carbon dioxide thereinto at 10° C. and the reaction was carried out for 5 hours under stirring. Then, carbon dioxide was replaced with nitrogen and 3.8 g of benzoyl peroxide was added to the reaction product, followed by stirring for 30 minutes. Starting materials were removed from the product by evaporation with a film evaporator to obtain 280 g of viscous liquid of pale yellow. This product had a NCO content of 4.35 meq/g, an oxadiazinetrione content of 2.22 meq/g and a residual monomer content of 0.8%.

EXAMPLE 1

A mixture of 100 parts of a butadiene homopolymer having hydroxyl groups at both terminals (average molecular weight 2,000 and 90% of butadiene units constituting the polymer chain comprise 1,2-bond), 50 parts of a bifunctional polyether polyol (average molecular weight 3,000), 50 parts of a trifunctional polyether polyol (average molecular weight 5,000), 7 parts of diethylene glycol, 13 parts of tolylene diisocyanate (2,4-/2,6-=80/20 weight ratio), 8 parts of the hexamethylene diisocyanate having oxadiazinetrione ring (2:1 adduct of hexamethylene diisocyanate and carbon dioxide) obtained in Reference Example 1, 0.046 part of dibutyltin dilaurate and 228 parts of ethyl acetate was reacted at 60° C. for 4 hours to obtain polyurethane polyol having oxadiazinetrione ring which had a viscosity of 990 cps at 25° C. and contained 50% of solid matter.

To 100 parts of said polyurethane polyol was added 0.025 part of 1,5-diazabicyclo[5,4,0]-5-undecene octylate and they were stirred. The resultant composition was coated on a release paper at a solid matter thickness of 100μ (the first side) and heated at 100° C. for 3 minutes. A rayon non-woven fabric (14 g/m²) was pressed thereonto. The composition was further coated on the non-woven fabric at a solid matter thickness of 100μ (the second side) and heated at 100° C. for 3 minutes. A release paper was pressed thereonto to obtain double-side adhesive tapes. Then, the tape was subjected to tests on adhesion, holding power and tackiness by allowing it to stand for 2 days under the three conditions of 23° C., 50% RH (Sample A-1), 45° C., 50% RH (Sample A-2) and 45° C., 90% RH (Sample A-3).

EXAMPLE 2

To 100 parts of the polyurethane polyol obtained in Example 1 were added 5 parts of a tackifier (terpene phenol resin), 5 parts of toluene and 0.025 part of 1,5-diazabicyclo[5,4,0]-5-undecene octylate. Using this composition a double-side adhesive tape was prepared in the same manner as in Example 1. This was allowed to stand at 23° C. and 50% RH for 2 days and then subjected to the tests (Sample B-1).

The above results are shown in Table 1. The test methods were as follows:

Adhesion

Each of the double-side adhesive tape was cut to 20 mm in width. The first side of thus cut tape was applied to SUS 304 stainless steel sheet and a polyester film (25μ thick) was applied to the second side. This was pressed by reciprocating 8 times a rubber roll of 2 kg thereover and allowed to stand at 23° C. for one hour. Then, this was subjected to 180° peel test at a peeling speed of 300 mm/min. at 23° C.

Holding power

The first side of the sample in an area of 20×20 mm² was applied to an SUS 304 stainless steel sheet and a polyester film (25μ thick) was applied to the second side. This was pressed by reciprocating 8 times a rubber roll of 2 kg thereover. In an atmosphere of 40° C., a static load of 1 kg was applied to one end of the sample tape and time required until the tape was cramped and dropped was measured.

Tackiness

Tackiness was measured by the ball tack method of J. Dow. That is, the sample was put on a plane inclined by 30° and steel balls of 1/32 tp 32/32 inch in diameter were rolled from the point 10 cm from the upper end at 23° C. The tackiness was expressed by the maximum diameter of the steel balls which stopped within 10 cm of the tacky surface.

TABLE 1

| Example No. | Sample No. | Adhesion (g/20 mm) | Holding power (h) | Tackiness |
|---|---|---|---|---|
| 1 | A-1 | 1400 | more than 24 hours | 10/32 |
|  | A-2 | 1400 | " | 8/32 |
|  | A-3 | 1500 | " | 10/32 |
| 2 | B-1 | 1700 | " | 12/32 |

EXAMPLE 3

A mixture of 100 parts of the same butadiene homopolymer having hydroxyl groups at both terminals as used in Example 1, 50 parts of a bifunctional polyether polyol (average molecular weight 3,000), 50 parts of a trifunctional polyether polyol (average melecular weight 5,000), 7 parts of diethylene glycol, 17 parts of 3-isocyanatomethyl-3,5,5-trimethylcyclohexyl isocyanate, 5 parts of the hexamethylene diisocyanate having oxadiazinetrione ring (2:1 adduct of hexamethylene diisocyanate to carbon dioxide) obtained in Reference Example 1, 0.046 part of dibutyltin dilaurate and 229 parts of ethyl acetate was reacted at 60° C. for 6 hours to obtain polyurethane polyol having oxadiazinetrione ring which had a viscosity of 1200 cps at 25° C. and contained 50% of solid matter.

To 100 parts of said polyurethane polyol was added 0.05 part of 1,5-diazabicyclo[5,4,0]-5-undecene octylate and they were stirred. Using this composition a double-side adhesive tape was prepared in the same manner as in Example 1. The tape was allowed to stand at 23° C. and 50% RH for 2 days and then subjected to the tests (Sample C-1).

EXAMPLE 4

An acrylic polyol having an average molecular weight of 6000 (hydroxyl value 18.7 mg KOH/g) was prepared from 80 parts of 2-ethylhexyl acrylate, 80 parts of butyl acrylate, 5 parts of 2-hydroxyethyl acrylate, 3.3 parts of 2-mercapto ethanol and 0.2 part of α,α'-azobisisobutyronitrile.

To 100 parts of this acrylic polyol were added 1.2 parts of hexamethylene diisocyanate, 1.6 parts of 1,3-bis(isocyanatomethyl)cyclohexane having oxadiazinetrione ring (2:1 adduct of 1,3-bis(isocyanatomethyl) cyclohexane to carbon dioxide) obtained in Reference Example 2, 0.021 part of dibutyltin dilaurate and 68.5 parts of ethyl acetate. The mixture was reacted at 60° C. for 4 hours to obtain polyurethane polyol having oxadiazinetrione ring which contained 50% of solid matter.

To 100 parts of said polyurethane polyol was added 0.03 part of 1,5-diazabicyclo[5,4,0]-5-undecene octylate, followed by stirring. Using this composition a double-side adhesive tape was prepared in the same manner as in Example 1. The tape was allowed to stand at 23° C. and 50% RH for 2 days and subjected to the tests (Sample D-1).

EXAMPLE 5

A mixture of 100 parts of the same butadiene homopolymer having hydroxyl groups at both terminals as used in Example 1, 50 parts of polydipropylene adipate (average molecular weight 2,000), 3 parts of dipropylene glycol, 12 parts of xylylene diisocyanate, 8 parts of 1,3-bis(isocyanatomethyl)cyclohexane having oxadiazinetrione ring obtained in Reference Example 2, 0.045 part of dibutyltin dilaurate and 148.7 parts of ethyl acetate was reacted at 60° C. for 4 hours to obtain polyurethane polyol having oxadiazinetrione ring which had a viscosity of 1500 cps at 25° C. and contained 60% of solid matter.

To 100 parts of said polyurethane polyol was added 0.03 part of 1,5-diazabicyclo[5,4,0]-5-undecene octylate, followed by stirring. Using this composition a double-side adhesive tape was prepared in the same manner as in Example 1. The tape was allowed to stand at 23° C. and 50% RH for 2 days and the subjected to the tests (Sample E-1).

The results of Examples 3 to 5 are shown in Table 2, wherein the test methods were conducted in the same manner as described hereinbefore.

TABLE 2

| Example No. | Sample No. | Adhesion (g/20 mm) | Holding power (h) | Tackiness |
|---|---|---|---|---|
| 3 | C-1 | 1700 | more than 24 hours | 16/32 |
| 4 | D-1 | 1500 | " | 13/32 |
| 5 | E-1 | 1200 | " | 10/32 |

We claim:

1. A one-can type pressure-sensitive adhesive composition which contains a polyurethane polyol obtained by the reaction of an isocyanate component having an oxadiazine-2,4,6-trione ring, other organic diisocyanate and a polyol component having a molecular weight of 400 to 50,000 at such a proportion that the number of oxadiazinetrione ring/the total number of free isocyanate group is in the range of ½ to 1/20 and (the number of oxadiazinetrione rings + the total number of free isocyanate groups)/(the number of hydroxyl group of the polyol component) is less than 1.0.

2. A one-can type pressure-sensitive adhesive composition according to claim 1 wherein the isocyanate component is the one prepared by the reaction of an isocyanate compound with carbon dioxide.

3. A one-can type pressure-sensitive adhesive composition according to claim 2 wherein the isocyanate compound is an aliphatic or alicyclic polyisocyanate.

4. A one-can type pressure-sensitive adhesive composition according to claim 1 wherein the other organic diisocyanate is an aliphatic, alicyclic, aromatic or aromatic-aliphatic diisocyanate.

5. A one-can type pressure-sensitive adhesive composition according to claim 1 wherein the polyol component is polyester polyol, polyether polyol, acrylic polyol, polyhydroxyalkane or a mixture thereof.

6. A one-can type pressure-sensitive adhesive composition according to claim 1 wherein the number of oxadiazinetrione rings/the total number of free isocyanate group is in the range of 1/5 to 1/15.

7. A one-can type pressure-sensitive adhesive composition according to claim 1 wherein (the number of oxadiazinetrione ring + the total number of free isocyanate group)/(the number of hydroxyl group of the polyol component) is in the range of 0.1 to 0.9.

8. A one-can type pressure-sensitive adhesive composition according to claim 1 which additionally contains a curing catalyst, tackifier, plasticizer, antioxidant, UV stabilizer and/or pigment.

9. A process for preparing polyurethane polyol which comprises reacting an isocyanate component having an oxadiazine-2,4,6-trione ring, other organic diisocyanate and a polyol component having a molecular weight of 400 to 50,000 at such a proportion that the number of oxadiazinetrione ring/the number of total free isocyanate groups is in the range of ½ to 1/20 and (the number of oxadiazinetrione ring + the total number of free isocyanate group)/(the number of hydroxyl group of the polyol component) is less than 1.0.

10. A one-can type pressure-sensitive adhesive composition according to claim 1, wherein said polyurethane polyol has an oxadiazine-2,4,6-trione ring and a terminal hydroxyl group in the molecule.

11. A process according to claim 9, wherein said polyurethane polyol has an oxadiazine-2,4,6-trione ring and a terminal hydroxyl group in the molecule.

* * * * *